US010155486B2

(12) United States Patent
Navarrete et al.

(10) Patent No.: US 10,155,486 B2
(45) Date of Patent: Dec. 18, 2018

(54) REVERSIBLE LOAD FLOOR FOR A MOTOR VEHICLE

(71) Applicant: FORD GLOBAL TECHNOLOGIES, LLC, Dearborn, MI (US)

(72) Inventors: Cecilia Acuna Navarrete, Alvaro Obregon (MX); Claudio Alberto Clamont Bello, Alvaro Obregon (MX)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 15/176,894

(22) Filed: Jun. 8, 2016

(65) Prior Publication Data
US 2017/0355322 A1    Dec. 14, 2017

(51) Int. Cl.
*B60N 99/00* (2006.01)
*B60R 13/01* (2006.01)
*B60P 7/08* (2006.01)
*B60R 5/04* (2006.01)

(52) U.S. Cl.
CPC .......... *B60R 13/013* (2013.01); *B60P 7/0892* (2013.01); *B60R 5/04* (2013.01)

(58) Field of Classification Search
CPC ......... B60R 13/013; B60R 5/04; B60P 7/0892
See application file for complete search history.

(56) References Cited

U.S. PATENT DOCUMENTS

| 4,733,898 | A | | 3/1988 | Williams | |
|---|---|---|---|---|---|
| 5,836,637 | A | * | 11/1998 | Laginess | B60N 3/063 |
| | | | | | 296/37.14 |
| 6,015,178 | A | * | 1/2000 | Haack | B60R 13/01 |
| | | | | | 296/39.2 |
| 6,247,741 | B1 | | 6/2001 | Seel et al. | |
| 6,253,943 | B1 | * | 7/2001 | Spykerman | B60R 7/02 |
| | | | | | 220/6 |
| 6,644,709 | B2 | | 11/2003 | Inagaki et al. | |
| 6,695,380 | B1 | * | 2/2004 | Hicks | B60R 5/04 |
| | | | | | 296/37.14 |
| 6,719,348 | B1 | | 4/2004 | Song | |
| 7,017,977 | B1 | * | 3/2006 | Kelter | B60P 7/135 |
| | | | | | 296/182.1 |
| 7,527,312 | B1 | * | 5/2009 | Cucknell | B60R 5/04 |
| | | | | | 296/193.07 |
| 8,215,693 | B2 | | 7/2012 | Ulita | |
| D755,708 | S | * | 5/2016 | Roach | D12/414.1 |
| 9,376,147 | B2 | * | 6/2016 | Craven | B62D 43/06 |
| 9,604,577 | B2 | * | 3/2017 | Ito | B60R 7/02 |
| 2002/0000733 | A1 | * | 1/2002 | Ryan | B60R 11/00 |
| | | | | | 296/37.1 |

(Continued)

FOREIGN PATENT DOCUMENTS

WO    2013178199 A1    12/2013

OTHER PUBLICATIONS

English Machine Translation of WO2013178199A1.

(Continued)

*Primary Examiner* — Lori L Lyjak
(74) *Attorney, Agent, or Firm* — Vichit Chea; King & Schickli, PLLC

(57) ABSTRACT

A reversible load floor is provided for a motor vehicle. The reversible load floor includes a body having a first user surface and a second user surface wherein the first user surface is opposed to the second user surface.

17 Claims, 5 Drawing Sheets

(56) References Cited

U.S. PATENT DOCUMENTS

| | | | | |
|---|---|---|---|---|
| 2002/0014777 | A1* | 2/2002 | Gehring | B60R 7/02 296/37.5 |
| 2003/0015531 | A1* | 1/2003 | Choi | B60R 5/04 220/200 |
| 2005/0045682 | A1* | 3/2005 | Tarrant | B60R 7/02 224/498 |
| 2005/0088009 | A1* | 4/2005 | Krueger | B62D 25/087 296/184.1 |
| 2008/0145172 | A1* | 6/2008 | Sturt | B60P 7/0876 410/118 |
| 2017/0080869 | A1* | 3/2017 | Clifford | B60R 7/04 |

OTHER PUBLICATIONS

"Mercedes Benz E Class Estate W211 2003 Road Test"; HonestJohn. co.uk; http://www.honestjohn.co.uk/road-tests/mercedes-benz/mercedes-benz-e-class-estate-w211-2003-road-test/; Feb. 19, 2003; pp. 1-2.

Chad King; "Secret Compartment in BMW 4 Series"; StashVault; https://www.stashvault.com/secret-compartment-bmw-trunk/; Jan. 2, 2014; p. 1 of 1.

\* cited by examiner

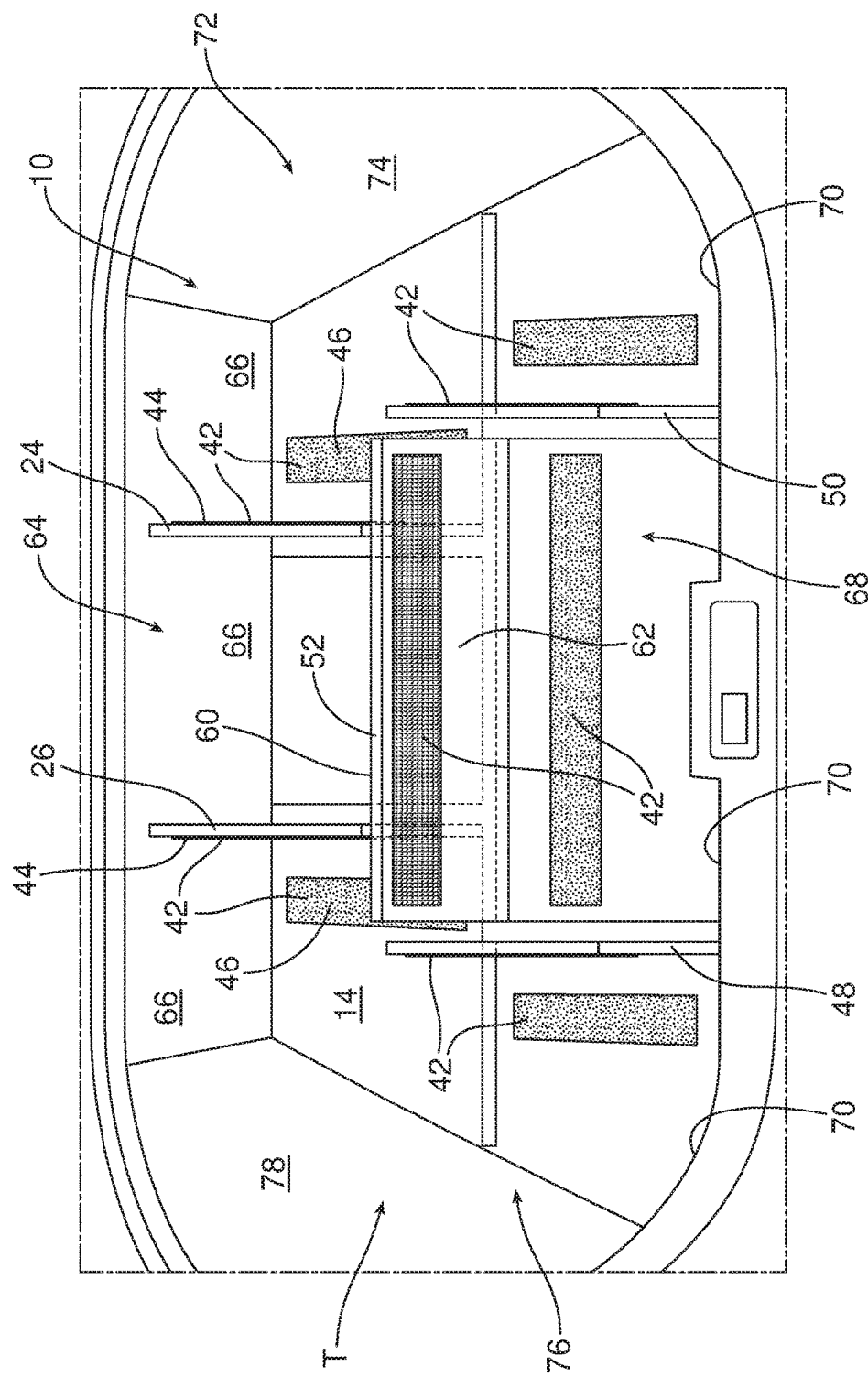

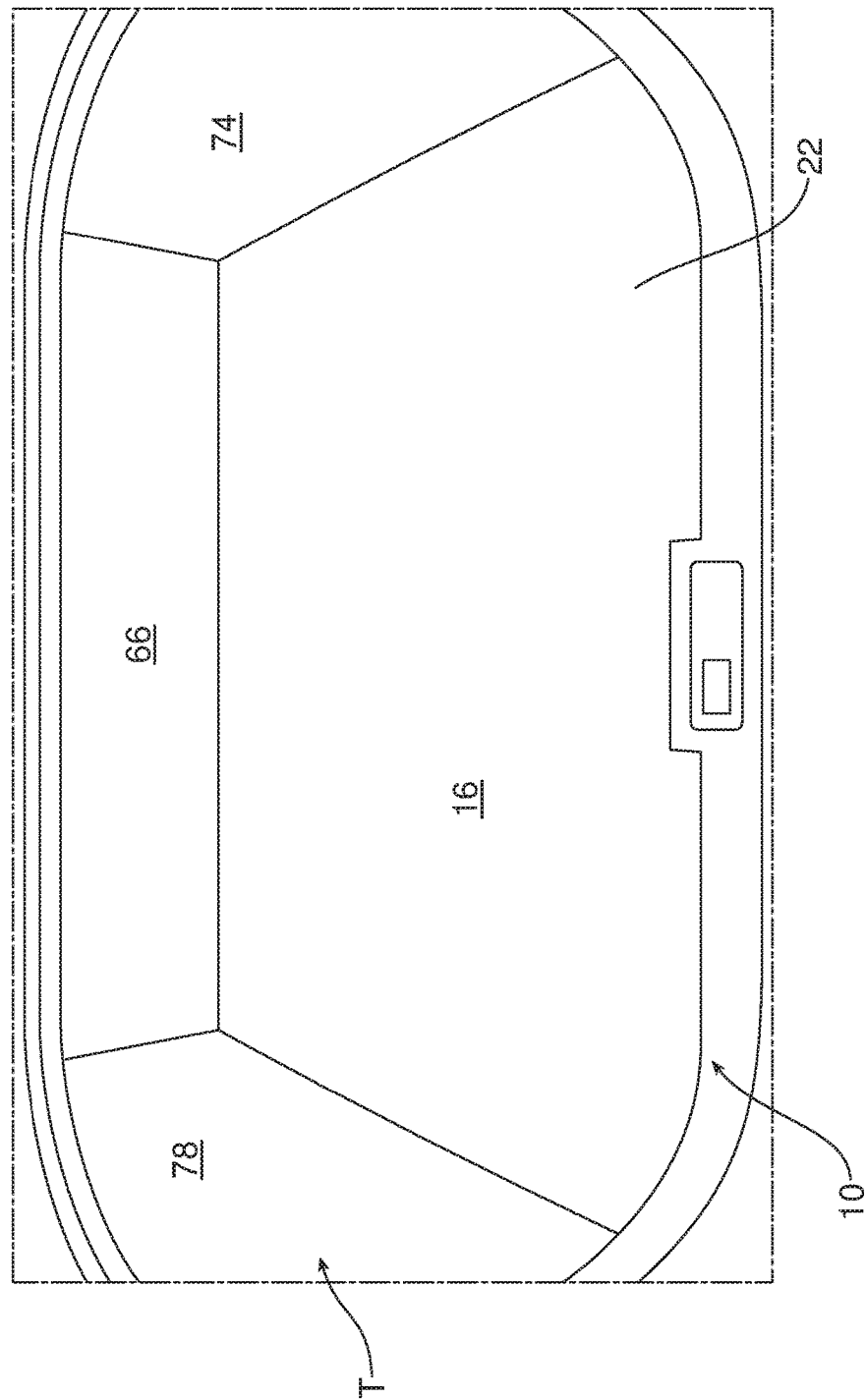

… (US 10,155,486 B2)

REVERSIBLE LOAD FLOOR FOR A MOTOR VEHICLE

TECHNICAL FIELD

This document relates generally to the motor vehicle equipment field and, more particularly, to a reversible load floor that provides additional options and versatility allowing a vehicle operator to better manage cargo being transported on the load floor in the motor vehicle.

BACKGROUND

Motor vehicles are utilized to transport various types of cargo. When one is transporting groceries, grocery bags may include heavy cans and tall bottles of juice as well as other items that are prone to slide or roll around in the cargo area. Often delicate, breakable items such as light bulbs and eggs are damaged if a system of partitions or other structures to compartmentalize the load floor are not provided in the motor vehicle. In contrast, transporting of large cargo items may require utilization of the entire load floor.

This document relates to a new and improved reversible load floor having two opposed user surfaces with different cargo retaining features. Advantageously, this enhances the versatility of the load floor to efficiently and effectively transport a larger variety of cargo to the benefit of the vehicle owner. For purposes of this document a "user surface" is a surface engineered to be oriented toward the user and provide a desired aesthetic quality and/or particular function. A user surface may incorporate one or more cargo retaining features.

SUMMARY

In accordance with the purposes and benefits described herein, a reversible load floor is provided for a motor vehicle. That reversible load floor comprises a body including a first user surface and a second user surface wherein the first user surface is opposed to the second user surface. The reversible load floor may further include a first partition connected by a first hinge to the first user surface. The first hinge may be a locking hinge.

The first partition may be displaceable between a stowed position flat against the first user surface and a deployed position projecting upwardly from the first user surface. The reversible load floor may further include a fastener releasably securing the first partition in the stowed position. That fastener may be a cooperating hook and look fastener.

The reversible load floor may further include a second partition connected by a second hinge to the first user surface. Further, the reversible load floor may include a third partition connected by a third hinge to the first user surface. Still further, the reversible load floor may include a fourth partition connected by a fourth hinge to the first user surface.

In one of many possible embodiments, the first and second partitions may be provided inboard and offset from the third and fourth partitions.

The body of the reversible load floor may include a first floor covering at the first user surface and a second floor covering at the second user surface. The first floor covering may be a first carpet layer. The second floor covering may be a second carpet layer.

The second user surface may be flat or some other configuration.

Still further, the reversible load floor may further include a fifth partition that is deployed perpendicular to the other four partitions. More specifically, a first face of the fifth partition may be oriented toward the first partition and the second partition while a second face of the fifth partition may be oriented toward the third partition and the fourth partition.

In the following description, there are shown and described several preferred embodiments of the reversible load floor. As it should be realized, the reversible load floor is capable of other, different embodiments and its several details are capable of modification in various, obvious aspects all without departing from the reversible load floor as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the reversible load floor and together with the description serve to explain certain principles thereof. In the drawing figures:

FIG. 3b is a view similar to FIG. 3a but showing all of the partitions on the first user surface in the fully deployed position.

FIG. 3c is a perspective view of the reversible load floor illustrated in FIG. 1 in yet another configuration with the second user surface oriented upward for receiving and holding cargo.

Reference will now be made in detail to the present preferred embodiments of the reversible load floor, examples of which are illustrated in the accompanying drawing figures.

DETAILED DESCRIPTION

Figure 1:
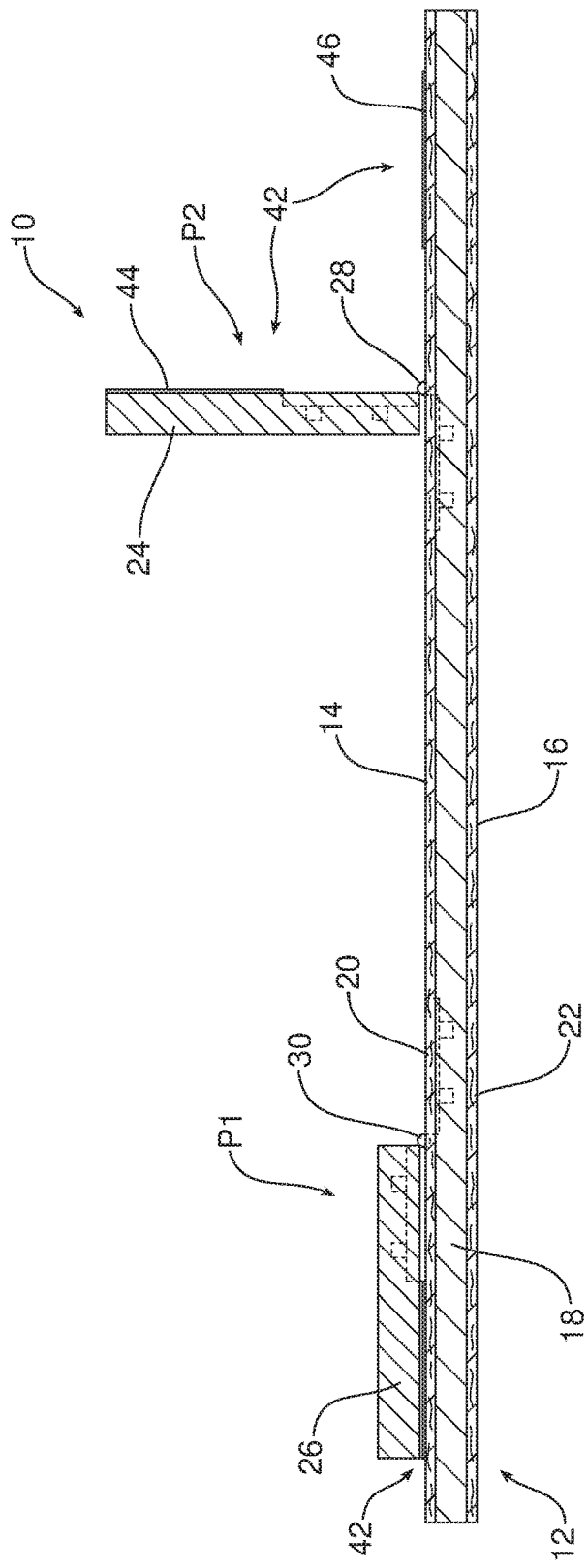
FIG. 1 is a cross sectional view of the reversible load floor clearly illustrating the body as well as the first user surface and second user surface.
Figure 2:
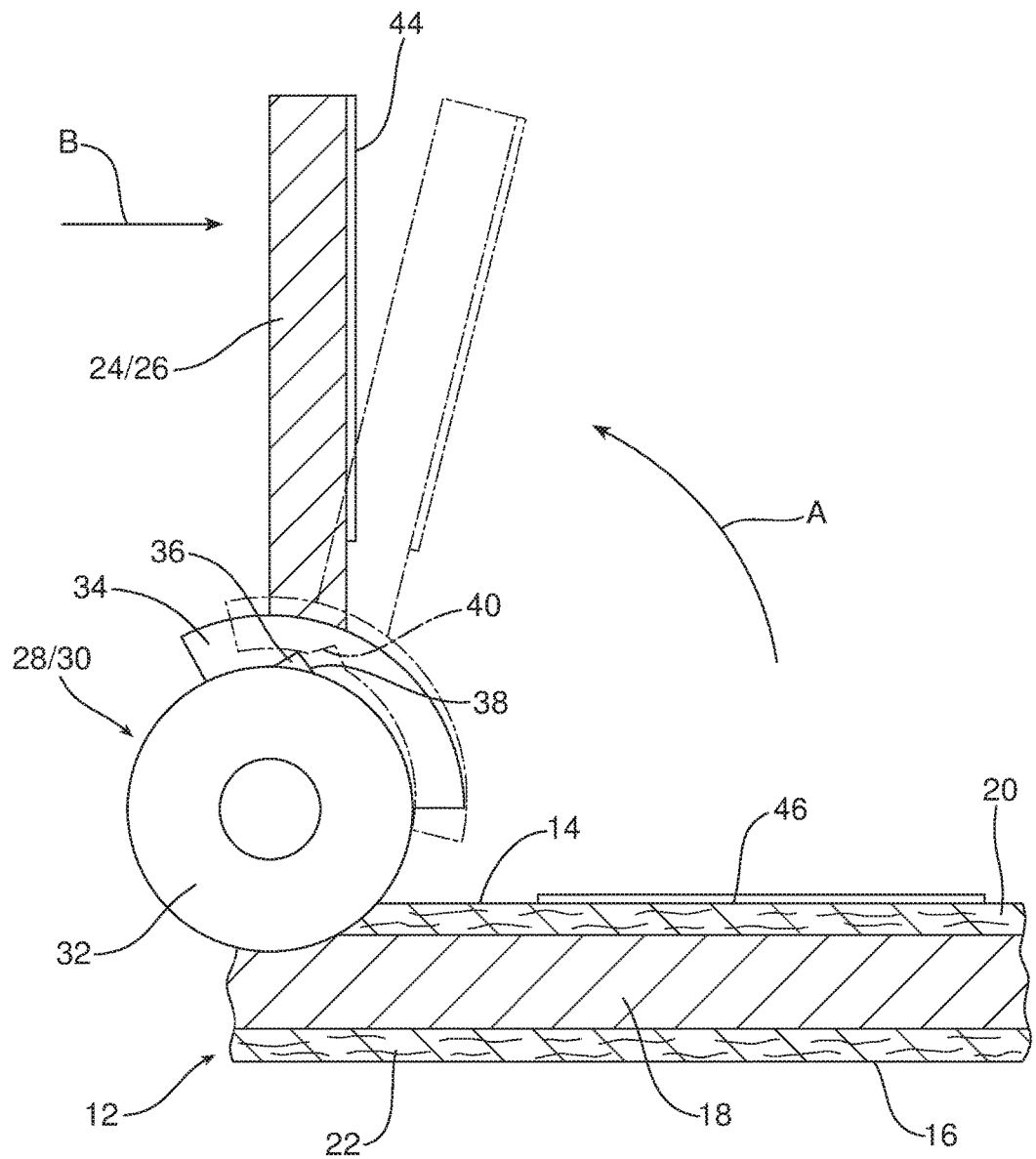
FIG. 2 is a detailed schematic view illustrating one possible embodiment of a locking hinge connecting a partition to the first user surface.

Reference is now made to FIGS. 1 and 2 illustrating a reversible load floor 10 that may be utilized to manage cargo being transported in a motor vehicle. In the illustrated embodiment, the reversible load floor 10 includes a body 12 including a first user surface 14 and a second user surface 16. As should be appreciated, the first user surface 14 is opposed to the second user surface 16. In the illustrated embodiment, the body 12 includes a substrate 18, a first floor covering 20 at the first user surface 14 and a second floor covering 22 at the second user surface 16.

The first floor covering 20 may comprise a first carpet layer. The second floor covering 22 may comprise a second carpet layer. Alternatively, the first and second floor coverings 20, 22 may be made from substantially any appropriate material including, for example, rubber with a raised edge adapted to trap liquid, dirt or other debris.

As further illustrated in FIGS. 1 and 2, the reversible load floor 10 includes cargo retaining features in the form of a first partition 24 and a second partition 26. More specifically, the first partition 24 is connected by a first hinge 28 to the first user surface 14. The second partition 26 is connected by a second hinge 30 to the first user surface 14.

As illustrated in FIG. 2, one or both of the hinges 28, 30 may comprise a locking hinge including a static cylindrical member 32 fixed to the body 12 and a cooperating rotating member 34 fixed to the partition 24/26. As illustrated, the static cylindrical member 32 includes a detent 36 with angled cam surfaces 38. The rotating component 34 includes a cooperating detent receiver 40.

As illustrated in FIG. 1, each partition 24, 26 may be displaced between a stowed position P1 flat against the first user surface 14 and a deployed position P2 projecting substantially perpendicular to the first user surface 14.

A cooperating hook and loop fastener 42 functions to hold the partition 24, 26 in the stowed position P1. In the illustrated embodiment, the hook portion 44 of the fastener is carried on the partition 24, 26 while the loop portion 46 of the fastener is carried on the first user surface 14.

When one wishes to deploy the partition 24, 26, one pivots the partition about the hinge 28, 30 by overcoming the fastening force of the hook and loop fastener 42. Once the partition 24, 26 is fully pivoted in the direction of action arrow A into the deployed position, the detent 36 snaps into the detent receiver 40 so that the hinge 28, 30 effectively locks the partition in the deployed position.

When wishes to return the partition 24, 26 to the stowed position, one pushes against the partition in the direction of action arrow B, overcoming the locking force of the detent 36 and forcing the partition to pivot about the hinge 28, 30 back into the stowed position P1 reengaging the hook and loop fastener 42.

In the illustrated embodiment, the second user surface 16 is flat and the only cargo retaining feature is the carpet or second floor covering 22.

Figure 3A:
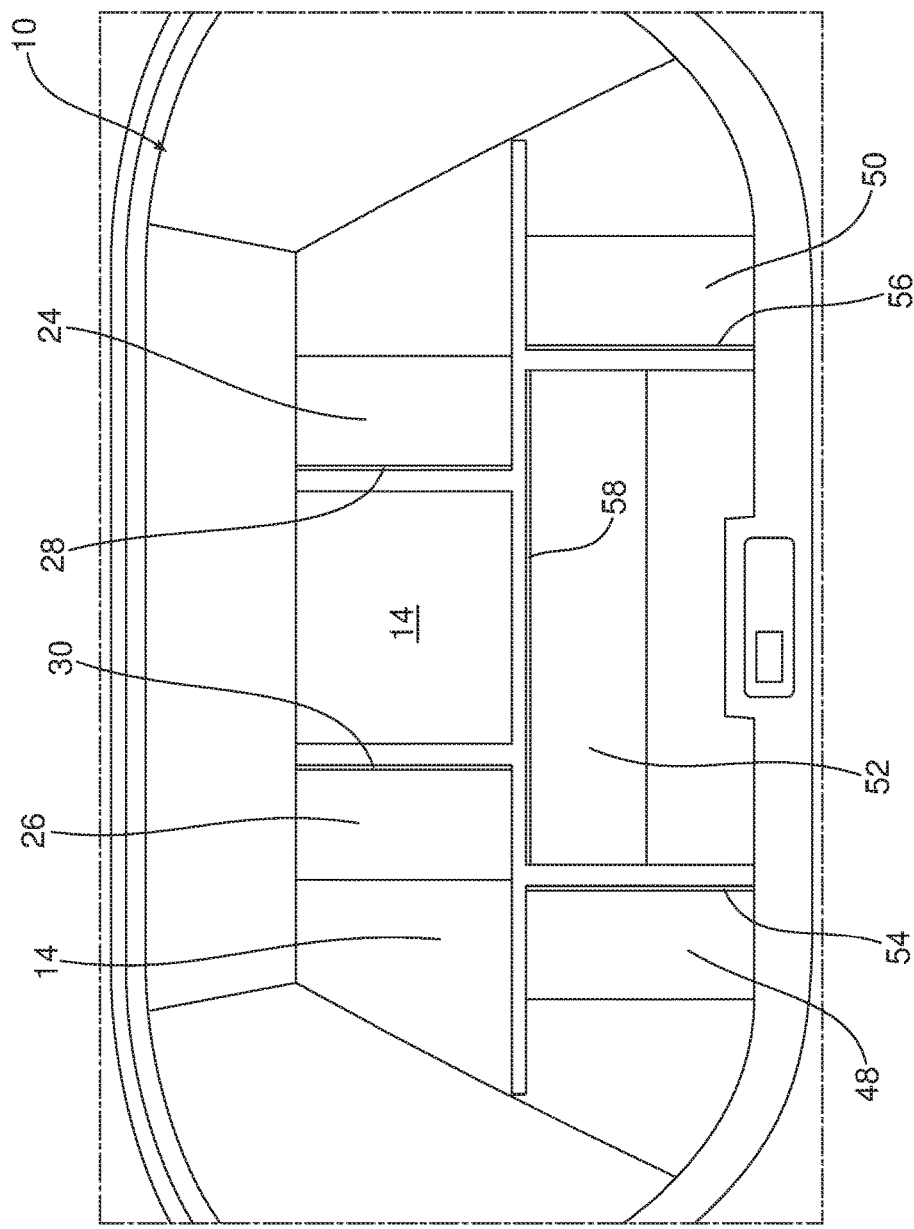
FIG. 3a is a perspective view illustrating the reversible load floor of FIG. 1 used in a first configuration with the first user surface oriented upward and the partitions on that surface all in a stowed position.

Reference is now made to FIG. 3a illustrating one possible embodiment of the reversible load floor including the first partition 24 and the second partition 26 as well as a third partition 48, a fourth partition 50 and a fifth partition 52. The third partition 48 is connected by a third hinge 54 to the first user surface 14. The fourth and fifth partitions 50, 52 are connected by respective fourth and fifth hinges 56, 58 to the first user surface 14. In FIG. 3a, all five partitions 24, 26, 48, 50, 52 are provided in the stowed position P1 flat against the body 12 at the first user surface 14. In contrast, in FIG. 3b, all five partitions 24, 26, 48, 50, 52 are illustrated in the deployed position P2 projecting upwardly at a substantially perpendicular angle to the first user surface 14. The third, fourth and fifth partitions 48, 50, 52 may all include fasteners 42 to lock them in the stowed position illustrated in FIG. 3a. Those fasteners 42 are visible in FIG. 3b when all the partitions 24, 26, 48, 50, 52 are all in the fully deployed position.

As should be appreciated, the five partitions 24, 26, 48, 50, 52 may all be displaced independently between the stowed positions P1 and the deployed positions P2 as desired by the user to meet user needs for transporting any particular cargo. In the illustrated embodiment, the first and second partitions 24, 26 are provided inboard and offset from the third and fourth partitions 48, 50.

When deployed, the fifth partition 52 projects perpendicular to the first partition 24, the second partition 26, the third partition 48 and the fourth partition 50 (see FIG. 3b). The first face 60 is oriented toward the first and second partitions 24, 26 in a vehicle forward direction while the second face 62 of the fifth partition is oriented toward the third and fourth partitions 48, 50 in a vehicle rearward direction. While not illustrated, it should be appreciated that the partitions 24, 26, 48, 50, 52 may include cooperating lugs and slots or other means to allow for interconnection when they are all in the deployed position P2.

As illustrated in FIG. 3b, the first partition 24, the second partition 26 and the fifth partition 52 form a first cargo retaining compartment 64 with the forward wall 66 of the motor vehicle trunk T. At the same time, the third partition 48, the fourth partition 50 and the fifth partition 52 form a second cargo compartment 68 with the rear wall 70 of the motor vehicle trunk T. A third cargo compartment 72 is formed between the first partition 24, the fourth partition 50, the fifth partition 52, the forward wall 66 of the trunk T, the rear wall 70 of the trunk and the right side wall 74 of the trunk. In addition, a fourth cargo compartment 76 is provided between the second partition 26, the third partition 48, the fifth partition 52, and the forward wall 66, the rearward wall 70 and the left side wall 78 of the trunk T. Together, the four cargo compartments 64, 68, 72, 76 provide four differently shaped areas for holding smaller cargo and preventing or limiting that cargo from shifting or rolling around the trunk T during operation of the motor vehicle.

Reference is now made to FIG. 3c which illustrates yet another configuration or operating mode of the reversible load floor 10. As illustrated in this figure, the reversible load floor 10 has been flipped so that the second user surface 16 is oriented upward to support cargo. The second user surface 16 of the illustrated embodiment is free of all partitions and provides a continuous uninterrupted flat surface covered in soft pile carpeting 22 to accommodate larger cargo such as a suitcase. The second user surface 16 may be utilized by the operator for any cargo application where the partitions 24, 26, 48, 50, 52 on the first user surface 14 are not required or even represent a hindrance.

As should be appreciated from the preceding description, the reversible load floor 10 provides a number of benefits and advantages including enhanced versatility for meeting the cargo management needs of the motor vehicle operator. Accordingly, it should be appreciated that the reversible load floor represents a significant advance in the motor vehicle accessory arts.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A reversible load floor for a motor vehicle, comprising:
   a body including a first user surface and a second user surface wherein said first user surface is opposed to said second user surface;
   a first partition pivotally connected by a first hinge to said first user surface; and
   a second partition pivotally connected by a second hinge to said first user surface.

2. The reversible load floor of claim 1, wherein said first hinge is a locking hinge.

3. The reversible load floor of claim 2, wherein said first partition is displaceable between a stowed position flat against said first user surface and a deployed position projecting upwardly from said first user surface.

4. The reversible load floor of claim 3, further including a fastener releasably securing said first partition in said stowed position.

5. The reversible load floor of claim 4, wherein said fastener is a hook and loop fastener.

6. The reversible load floor of claim 5, further including a third partition connected by a third hinge to said first user surface.

7. The reversible load floor of claim 6, further including a fourth partition connected by a fourth hinge to said first user surface.

8. The reversible load floor of claim 7, wherein said first partition and said second partition are inboard and offset from said third partition and said fourth partition.

9. The reversible load floor of claim 8, further including a fifth partition deployed perpendicular to said first partition, said second partition, said third partition and said fourth partition.

10. The reversible load floor of claim 9, wherein a first face of said fifth partition is oriented toward said first partition and said second partition and a second face of said fifth partition is oriented toward said third partition and said fourth partition.

11. The reversible load floor of claim 10, wherein said body includes a first floor covering at said first user surface and a second floor covering at said second user surface.

12. The reversible load floor of claim 11, wherein said first floor covering is a first carpet layer.

13. The reversible load floor of claim 12, wherein said second floor covering is a second carpet layer.

14. The reversible load floor of claim 13, wherein said second user surface is flat.

15. The reversible load floor of claim 1, wherein said body includes a first floor covering at said first user surface and a second floor covering at said second user surface.

16. The reversible load floor of claim 15, wherein said first floor covering is a first carpet layer.

17. The reversible load floor of claim 16, wherein said second floor covering is a second carpet layer.

\* \* \* \* \*